US009899947B2

United States Patent
Chuang

(10) Patent No.: US 9,899,947 B2
(45) Date of Patent: Feb. 20, 2018

(54) CONTROL APPARATUS FOR DC INVERTER ELECTRIC MOTOR

(71) Applicant: Jaguar Precision Industry Co., Ltd., New Taipei (TW)

(72) Inventor: Fei-Tyh Chuang, New Taipei (TW)

(73) Assignee: Jaguar Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 15/079,060

(22) Filed: Mar. 24, 2016

(65) Prior Publication Data

US 2017/0214353 A1   Jul. 27, 2017

Related U.S. Application Data

(63) Continuation of application No. PCT/CN2013/086087, filed on Oct. 28, 2013.

(51) Int. Cl.
*H05B 41/392* (2006.01)
*H02P 27/06* (2006.01)

(52) U.S. Cl.
CPC .................... *H02P 27/06* (2013.01)

(58) Field of Classification Search
CPC ..... H02J 1/00; H02J 3/01; H02M 7/06; H05B 37/0245; H05B 39/08; H05B 41/3924; H02P 27/06; H02P 27/04

(Continued)

(56) References Cited

U.S. PATENT DOCUMENTS 4,274,037 A * 6/1981 Soeda ................... H02P 7/2913
                                                318/266
4,513,231 A    4/1985 Kuno ............................ 388/821
(Continued)

FOREIGN PATENT DOCUMENTS

CN          201178392         1/2009
CN          201178392 Y       1/2009
(Continued)

OTHER PUBLICATIONS

Chinese Official Action (Taiwanese application No. 102104806), dated Oct. 17, 2014, TW.

(Continued)

*Primary Examiner* — Rita Leykin
(74) *Attorney, Agent, or Firm* — Bui Garcia-Zamor; Jessica H. Bui, Esq.

(57) ABSTRACT

A control apparatus for a DC inverter electric motor comprising a control module and a controlled module is disclosed. The control module includes a phase-cut that continuously cut off a conduction angle of the AC power supply. The controlled module comprises a rectification circuit for rectifying the AC power supply after being cut off, a phase detection circuit for detecting the cut-off conduction angle, and a control unit for controlling the rotational speed or action of the motor according to the conduction angle that is detected by the phase detection circuit. The control apparatus makes use of the size of the conduction angle to act as control command and thus does not has the issue of reduced power factor. No complex or complicated circuits or wires have to be disposed and the functions can be achieved by making use of existing wiring. It is thus easy to install, cost-effective, and easy to maintain.

16 Claims, 5 Drawing Sheets

(58) Field of Classification Search
USPC ........ 318/812, 662, 729, 438; 323/217, 300, 323/312; 315/287, 194, 186, 200 R
See application file for complete search history.

(56) References Cited

U.S. PATENT DOCUMENTS

| | | | | |
|---|---|---|---|---|
| 4,933,798 | A * | 6/1990 | Widmayer | H02M 5/293 315/248 |
| 5,825,642 | A * | 10/1998 | Ishii | H02M 3/28 361/25 |
| 8,102,167 | B2 * | 1/2012 | Irissou | H05B 39/02 315/194 |
| 8,581,518 | B2 * | 11/2013 | Kuang | H05B 33/0809 315/185 R |
| 8,736,185 | B2 * | 5/2014 | Chen | H05B 33/0845 315/200 R |
| 8,884,537 | B2 * | 11/2014 | Liao | G05F 1/10 315/179 |
| 8,933,648 | B1 * | 1/2015 | Putman | H05B 33/0815 315/291 |
| 8,964,427 | B2 * | 2/2015 | Kerkman | G01R 25/00 327/156 |
| 9,130,449 | B2 * | 9/2015 | Hsu | H02M 7/04 |
| 9,198,245 | B2 * | 11/2015 | Deng | H05B 33/0815 |
| 9,271,366 | B2 * | 2/2016 | Yu | H05B 33/0839 |
| 2005/0012490 | A1 | 1/2005 | Ueda et al. | 318/807 |
| 2010/0308742 | A1 * | 12/2010 | Melanson | H05B 33/0815 315/224 |
| 2011/0127925 | A1 * | 6/2011 | Huang | H05B 37/0263 315/287 |
| 2011/0291583 | A1 | 12/2011 | Shen | 315/287 |
| 2012/0299572 | A1 * | 11/2012 | Eom | H05B 33/0815 323/312 |
| 2013/0241428 | A1 | 9/2013 | Takeda | 315/210 |

FOREIGN PATENT DOCUMENTS

| | | |
|---|---|---|
| CN | 201303307 Y | 9/2009 |
| CN | 102368677 A | 3/2012 |
| EP | 0 053 896 A1 | 11/1981 |
| JP | 9-238492 A | 9/1997 |
| JP | 10-290600 A | 10/1998 |
| TW | M378570 | 4/2010 |
| WO | WO 2013/005472 A1 | 11/2013 |

OTHER PUBLICATIONS

International Search Report (Publication No. WO 2015/061950), dated May 7, 2015, PCT.

Supplementary European Search Report, dated Aug. 28, 2017, EP.

* cited by examiner

US 9,899,947 B2

CONTROL APPARATUS FOR DC INVERTER ELECTRIC MOTOR

CROSS-REFERENCE TO RELATED APPLICATIONS

This application is a continuation International Patent Application No. PCT/CN2013/086087 filed on Oct. 28, 2013, published as International Publication No. WO 2015/061950 Al, which is incorporated by reference herein in its entirety.

FIELD OF THE INVENTION

The present invention relates to a control apparatus, particularly to a control apparatus for a DC inverter electric motor.

DESCRIPTIONS OF THE RELATED ART

Speed adjustment technology for inverter electric motors is an important trend for developing modern power electronics technology. Inverter electric motor may be divided into DC (direct current) and AC (alternating current) types essentially. The electric control system of DC inverter electric motor is more complex than that of AC inverter electric motor. As DC inverter electric motor provides improved effect in the aspect of energy-saving, nowadays DC inverter electric motor is gaining popularity and more and more household appliances, such as air conditioners, fans etc., switch to use DC inverter motors. Moreover, DC inverter electric motor is also superior to AC inverter electric motor with respect to comfort, silence, life span and control precision. As such, the market for DC inverter electric motor grows tremendously.

Generally, a DC inverter electric motor is driven by a frequency converter which rectifies/filters AC power supply in 60 Hz, and then provides DC power supply to the circuits. The control unit of the DC inverter electric motor controls the switching of the power components based on external commands to control the current flowing into the coil of the electric motor, and thereby achieve the objective of speed adjustment.

The rotational speed of traditional single-phase induction motor can be changed by cascading capacitors having different capacitances. The speed is adjusted by changing the slip by means of the capacitors using AC power. Therefore, the capacitors may be mounted at the wall control end (distal end). Switching to different capacitors through the wall control end will easily change the rotational speed of a unidirectional induction motor. However, when the induction motor is replaced by inverter electric motor, cascaded capacitors (capacitors connected in series) becomes ineffective completely after rectification/filtering. As such, the capacitor wall control method used for traditional single-phase induction motor is not applicable to DC inverter electric motor.

Currently, the most common control method for DC inverter electric motor is to use an independent signal line for control. However, the wiring layout has to be changed accordingly, which complicates the wiring design and bears a burden of cost. Therefore, it is desired in the pertinent industry to provide a control apparatus for a DC inverter electric motor which is simple in circuit layout and does not need to further arrange the signal lines, while provides a superior control effect.

SUMMARY OF THE INVENTION

The present invention provides a control apparatus for a DC inverter electric motor comprising primarily a control module and a controlled module, wherein the control module includes a phase-cut circuit that is electrically connected with an AC power supply, and cut off a conduction angle of the AC power supply continuously. The controlled module at a load end comprises a rectification circuit, a phase detection circuit, a control unit and a drive circuit for the inverter electric motor. The rectification circuit is electrically connected with the phase-cut circuit to rectify the AC power supply after being cut off by the phase-cut circuit. The phase detection circuit is electrically connected with the rectification circuit. The phase detection circuit is used for detecting the conduction angle of the AC power supply continuously after being cut off by the phase-cut circuit. The control unit and the phase detection circuit are electrically connected with the electric motor. The control unit controls the drive circuit for the electric motor to change rotational speed or action of the electric motor according to the conduction angle of the AC power supply which is detected by the phase detection circuit and cut off by the phase-cut circuit.

Preferably, when a triple-pole AC switch is used as the phase-cut circuit, the controlled module of the present invention may further include a bleeder circuit which is electrically connected with the rectification circuit. The bleeder circuit provides the triple-pole AC switch with sufficient latching current and holding current to prevent the triple-pole AC switch from false triggering. The aforementioned bleeder circuit may be an active bleeder circuit.

Furthermore, the phase-cut circuit of the present invention comprises: a triple-pole AC switch having a first terminal, a second terminal and a gate; a bipolar AC switch having a first anode connected with the gate of the triple-pole AC switch, and a second anode terminal; a variable resistor in electrical connection with the second terminal; a resistor in electrical connection with the variable resistor; and a capacitor having a first end electrically connected with the resistor and the second anode terminal of the double-pole AC switch, and a second end electrically connected with the first terminal of the triple-pole AC switch; wherein the variable resistor is adjustable to modulate the size of the conduction angle of AC after having been cut off by the phase-cut circuit.

The phase-cut circuit of the present invention further comprises a switched capacitor and a change-over switch. The switched capacitor is connected with the change-over switch in series, followed by connection with the capacitor in parallel. Preferably, switching the change-over switch may allow the phase-cut circuit to generate a control signal responsive to an abrupt change of the conduction angle, and the control signal enables the drive circuit to control the inversion of the DC inverter electric motor.

Preferably, the controlled module of the present invention further comprises an EMI (electromagnetic interference) filter circuit and a power factor modulation circuit, which may be in electrical connection with the phase-cut circuit and the rectification circuit.

Accordingly, in comparison with the phase controller used conventionally for the triple-pole AC switch, the present invention uses the conduction angle as a command for modulating functions such as speed, duty cycle, etc. Also, most importantly, the present invention does not make use of the conduction angle to control energy transfer. Thus, the circuits may operate under a larger conduction angle, and thus may perform a wide range modulation. As such, the issue of reduced power factor in deep dimming commonly found in conventional triple-pole AC switch does not exist. Furthermore, no additional wiring is necessary for the control apparatus for DC inverter electric motor according to the present invention. The conduction angle of the AC may be effectively used to modulate the DC inverter electric motor simply through existing power line.

DETAILED DESCRIPTION OF THE PREFERRED EMBODIMENT

Figure 1:
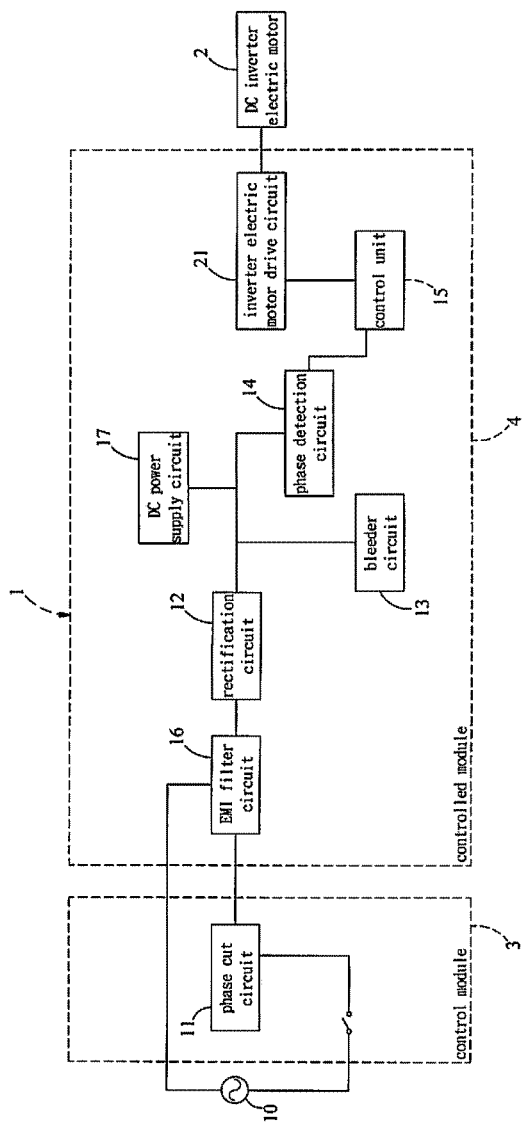
FIG. 1 shows a block diagram of a system according to a preferred embodiment of the present invention.
Figure 2:
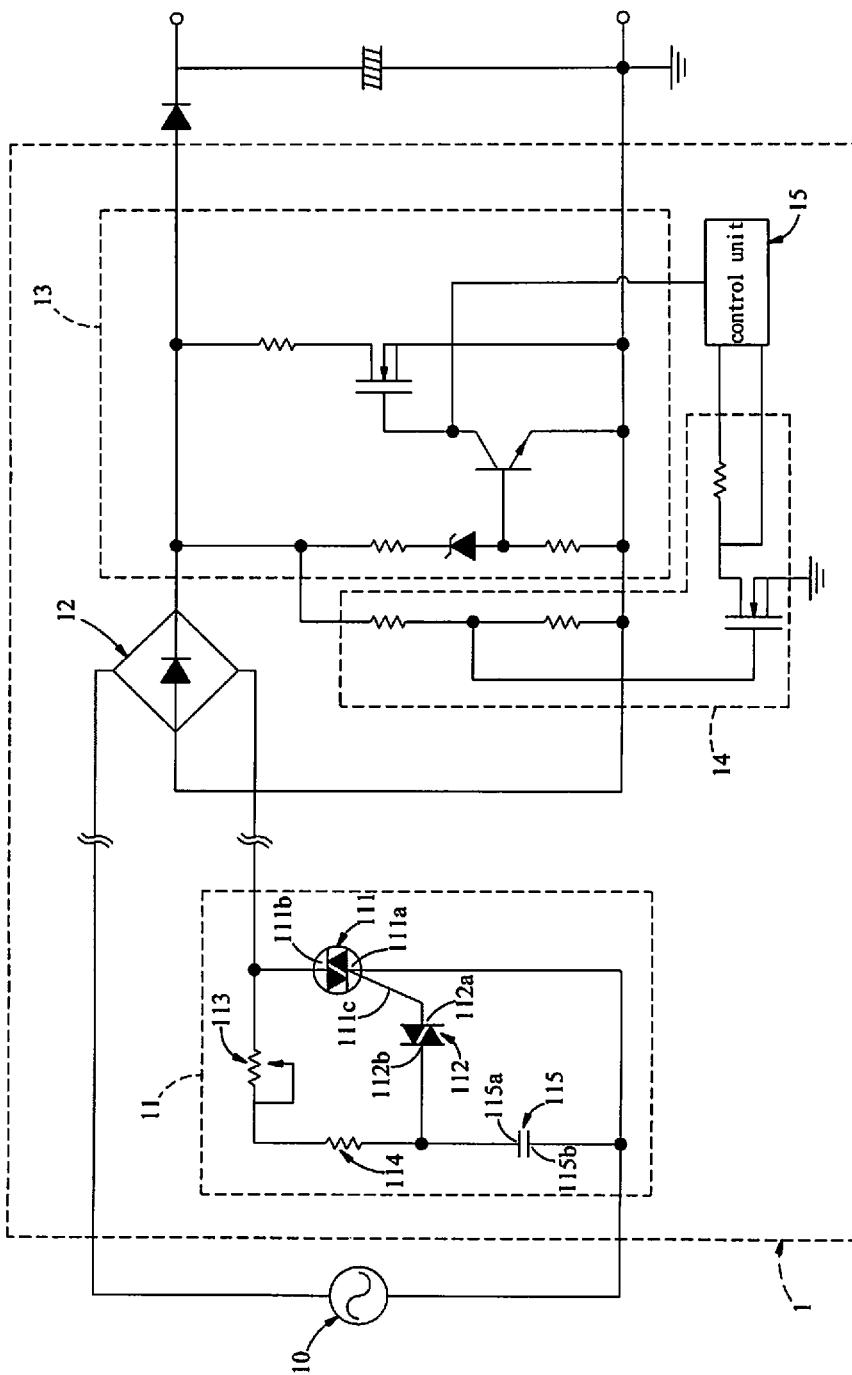
FIG. 2 shows a circuit architecture diagram of a preferred embodiment according to the present invention.

Referring to both FIGS. 1 and 2, in which FIG. 1 shows a system block diagram of a system of a preferred example according to the present invention, and FIG. 2 shows a circuit architecture diagram of a preferred example according to the present invention. As shown in the figures, a control apparatus for a DC inverter electric motor 1 according to the present invention includes primarily a control module 3 arranged at a control end and a controlled module 4 arranged at a load end. In this embodiment, the control end is, for example, a wall control end, and the load end is a proximal end arranged at a DC inverter electric motor 2. The control module 3 consists of a phase-cut circuit 11, while the controlled module 4 consists of a rectification circuit 12, a bleeder circuit 13, a phase detection circuit 14, a control unit 15, an EMI filter circuit 16, a DC power supply circuit 17 and a drive circuit for the inverter electric motor 21.

The phase-cut circuit 11 and an AC power supply 10 are electrically connected to each other. The phase-cut circuit 11 continuously cut off the conduction angle of the AC power supply until it is desired to change the rotational speed or action of the DC inverter electric motor 2, at which point a different conduction angle of the AC power supply is cut off again. In addition, the rectification circuit 12 is electrically connected with the phase-cut circuit 11 of the control module 3 for rectifying the AC that has been cut-off. The bleeder circuit 13 is electrically connected with the rectification circuit 12, and provides the triple-pole AC switch with sufficient latching current and holding current, so as to prevent the triple-pole AC switch from false triggering.

In addition, the DC inverter electric motor 2 is driven by the drive circuit 21. The phase detection circuit 14 is electrically connected with the rectification circuit 12 and the control unit 15, and is designed to detect the conduction angle that has been cut off. Additionally, the control unit 15 is electrically connected with the phase detection circuit 14, so as to control the drive circuit for the inverter electric motor 21 according to the cut off conduction angle of the AC power supply 10 that is detected by the phase detection circuit 14, and to modulate the rotational speed or PWM duty cycle etc. of the DC inverter electric motor 2. For the sake of description, the DC inverter electric motor 2 in this embodiment is illustrated as a fan electric motor.

Referring to FIG. 2 which shows the circuit layout of the control apparatus for DC inverter electric motor 1 according to this embodiment. As shown in the figure, the phase-cut circuit 11 includes a triple-pole AC switch 111, a bipolar AC switch 112, a variable resistor 113, a resistor 114 and a capacitor 115. The triple-pole AC switch 111 comprises a first terminal 111a, a second terminal 111b and a gate 111c. The bipolar AC switch 112 comprises a first anode terminal 112a electrically connected with the gate 111c of the triple-pole AC switch 111, and a second anode terminal 112b. The variable resistor 113 is in electrical connection with the second terminal 111b, and the resistor 114 is in electrical connection with the variable resistor 113. The capacitor 115 comprises a first end 115a which is electrically connected with the resistor 114 and the second anode end 112b, and a second end 115b which is electrically connected with the first terminal 111a.

This embodiment is characterized in that: by adjusting the variable resistor 113 of the phase-cut circuit 11, it is possible to adjust correspondingly the size of the conduction angle of the AC that is continuously cut off by the phase-cut circuit 11, and after the cut off conduction angle is subject to the phase detection circuit 14, the control unit 15 controls the inverter drive circuit 21 to activate the DC inverter electric motor 2 to rotate under a corresponding speed according to the conduction angle detected by the phase detection circuit 14. Preferably, the size of the AC conduction angle cut off by the phase cut-off circuit 11 is in the range between 0° to 60°. As such, the power factor is not affected.

Figure 3:
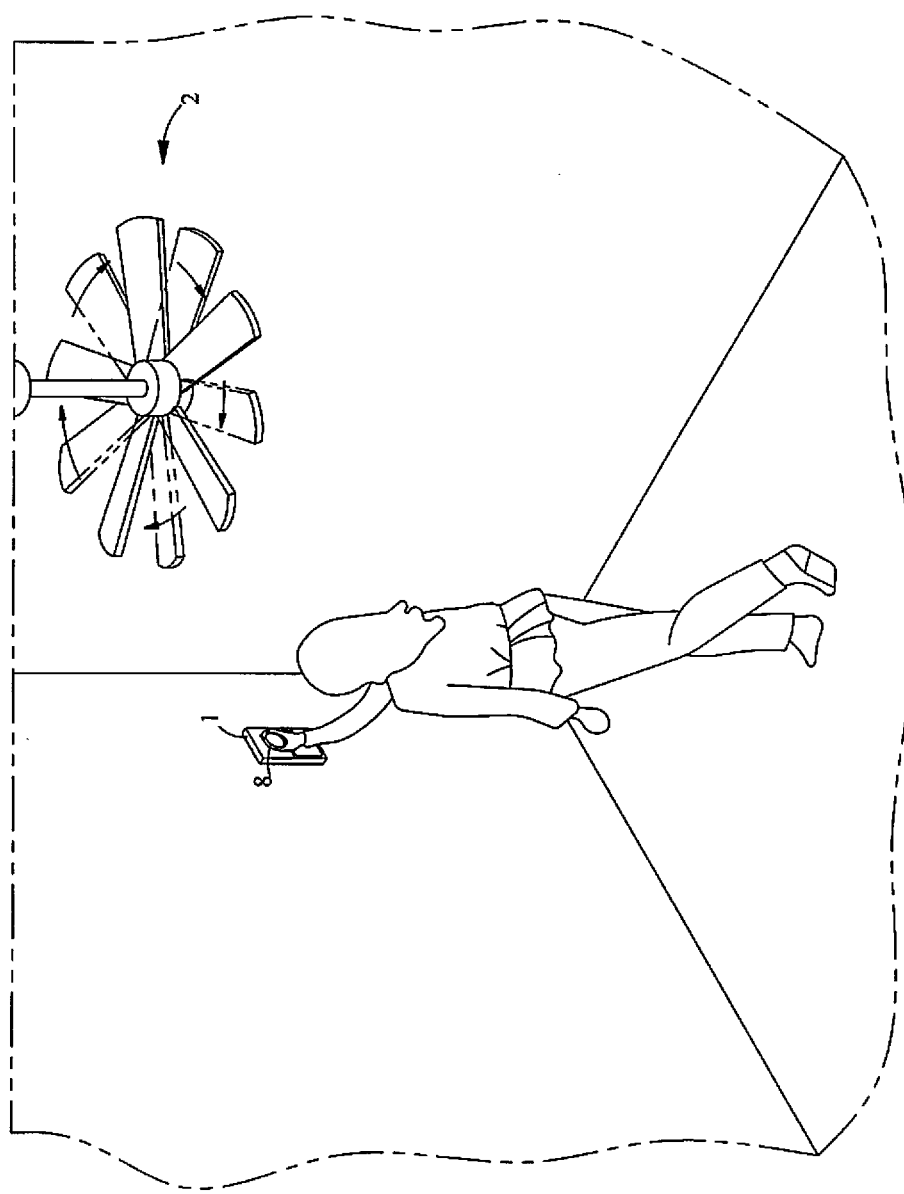
FIG. 3 is a schematic diagram showing the operation of a preferred embodiment according to the present invention.

For details of the operation of this embodiment, please refer to FIGS. 2 and 3. FIG. 3 is a schematic view illustrating the operation of a preferred embodiment according to the present invention. As shown in the figures, a user may vary the resistance of the variable resistor 113 by a knob 8 to adjust the rotational speed of the DC inverter electric motor 2. In this embodiment, the phase-cut circuit 11 is designed on a wall control end so that the user may adjust the variable resistor 113 simply by turning the knob 8. As the DC inverter electric motor 2 is embodied as a fan electric motor in this embodiment, a ceiling fan 7 is the object to be driven by the DC inverter electric motor 2. Adjusting the variable resistor 113 by the knob 8 may adjust the rotational speed of the DC inverter electric motor 2, and in turn, the wind speed of the ceiling fan 7.

As this embodiment makes use of the variable resistor 113 to adjust the DC inverter electric motor 2, fine tuning of the rotational speed and wind speed is possible, and the effect of "stepless modulation" can be obtained. It is to be noted that the variable resistor may be replaced with a stepping switch consists of serially connected resistors having different resistivities to conduct step control. Further, it is also possible to replace the capacitor 115 with a stepping switch with different capacitances cascaded for step control.

Figure 4:
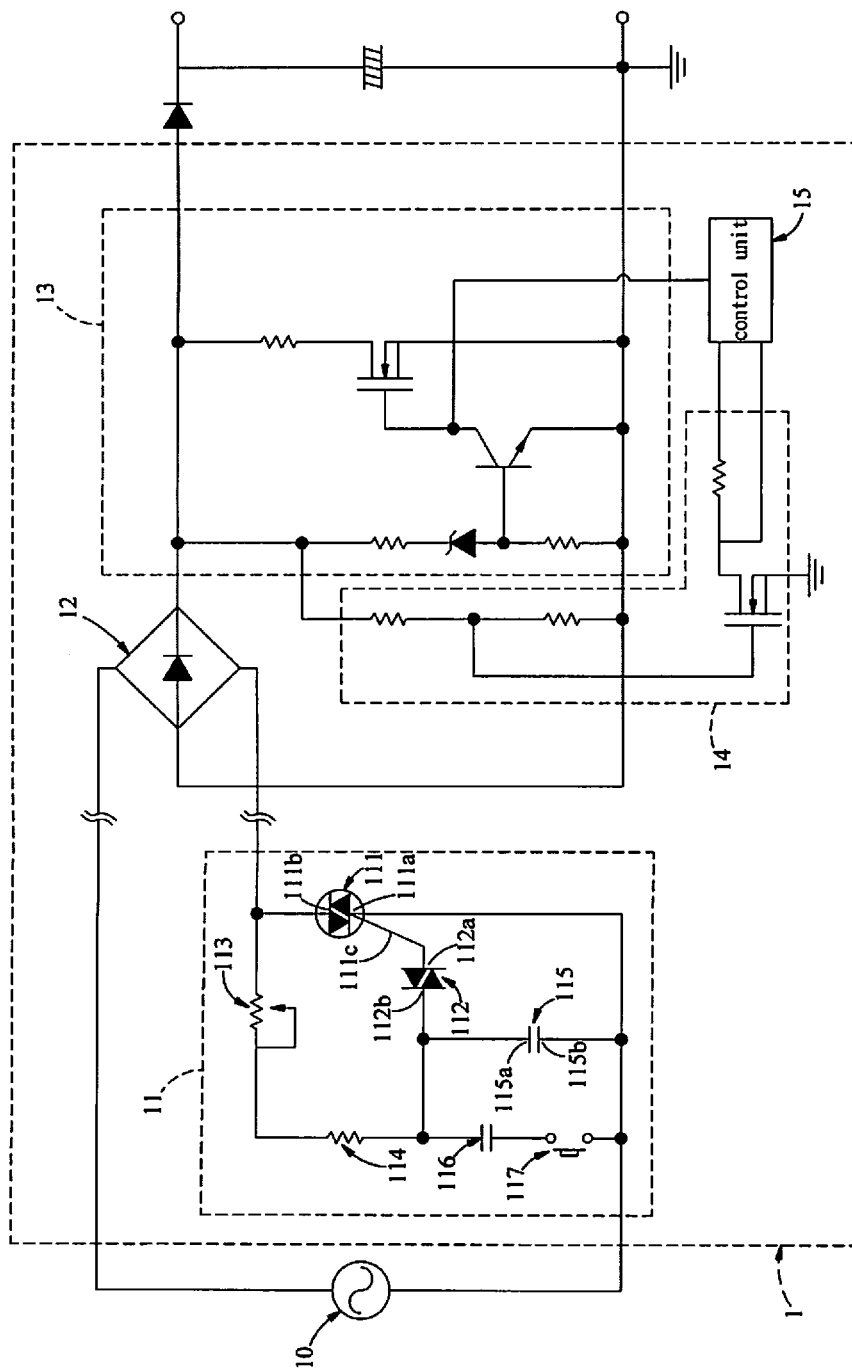
FIG. 4 shows a circuit architecture diagram of a further preferred embodiment according to the present invention.
Figure 5:
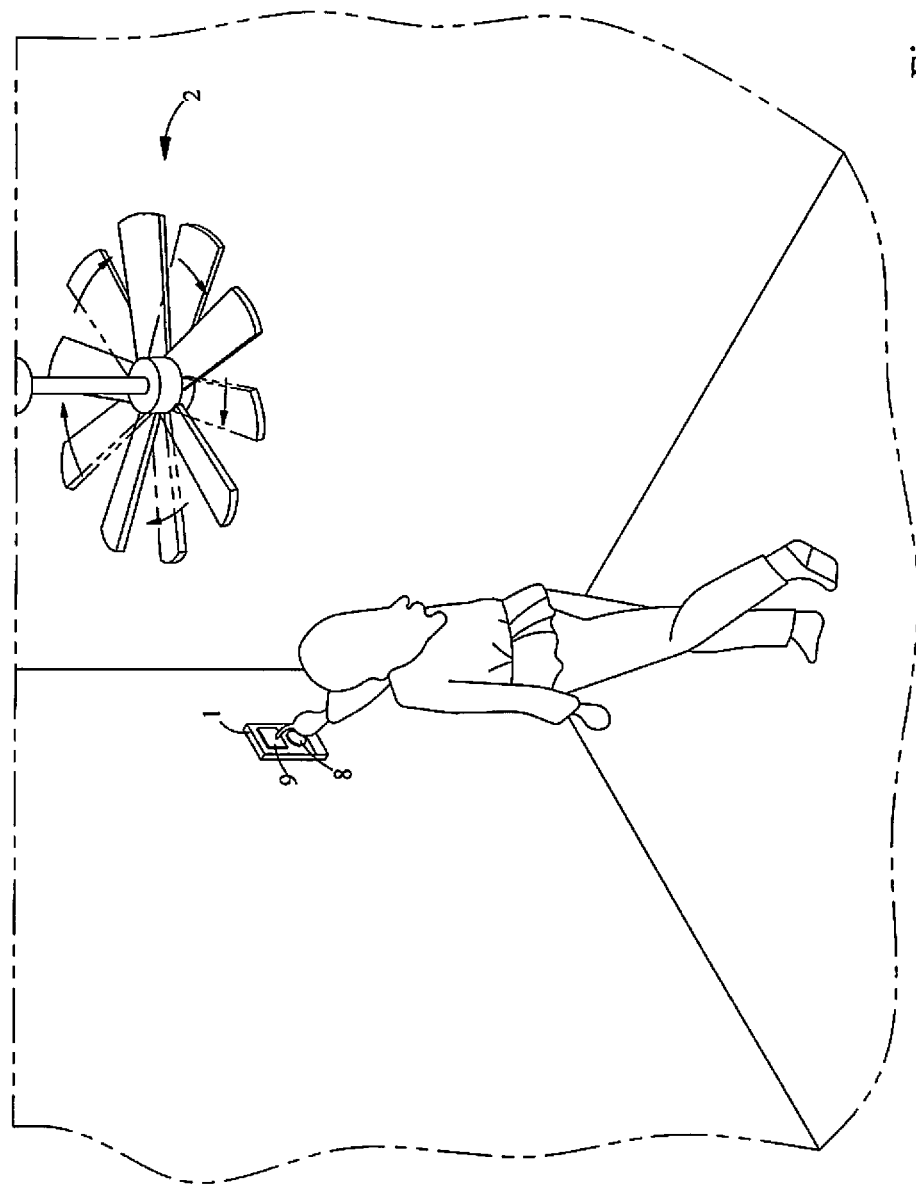
FIG. 5 is a schematic diagram showing a further preferred embodiment according to the present invention.

FIG. 4 shows a circuit architecture diagram of a further preferred embodiment according to the present invention. In a further embodiment of the present invention, a switched capacitor 116 and a change-over switch 117 are further provided in the phase-cut circuit 11. As shown in the figure, the switched capacitor 116 is connected with the change-over switch 117 in series, followed by connection with the capacitor 115 in parallel. Preferably, the change-over switch 117 is a bounce switch. Pressing the change-over switch 117 will enable the conduction of the capacitor, which will cut off the phase angle to produce an abrupt change in the conduction angle, and which change may act as a control signal to instruct the DC inverter electric motor 2 to make an inversion. The control signal will actuate the drive circuit 21 of the DC inverter electric motor 2 to control the inversion of the DC inverter electric motor 2. Also, please refer to FIGS. 4 and 5 for further details of the operation. FIG. 5 is a schematic drawing showing the operation of another preferred embodiment according to the present invention. As shown in the figures, the switch 9 is connected with the change-over switch 117. The switching of the change-over switch 117 results in the synchronous switching of the switch 9, and enables the phase-cut circuit 11 to generate a control signal to actuate the ceiling fan 7 to inverse.

In the description for the preferred embodiments, commonly known functional circuits, such as the power factor modulation circuits commonly used for typical power supply circuits, are omitted. However, the functional circuits may be modified or included if necessary.

In summary, with the DC inverter electric motor control apparatus 1 provided in this embodiment, complex and complicated circuits are not needed for the DC inverter electric motor 2, and no circuit wiring has to be modified. That is, it is possible to modulate the DC inverter electric motor 2 by means of the conduction angle of AC simply by making use of existing wiring. Hence, the present invention provides the advantages such as easy installation, low manufacturing cost and easy maintenance.

While the preferred embodiments have been described as above, it is to be noted that the description and accompanying drawings disclosed herein are not intend to restrict the scope of implementation of the present invention. Variations and modifications equivalent to the above embodiments and able to be realized are considered to be within the scope of the present invention.

What is claimed is:

1. A control apparatus for a DC inverter electric motor, comprising:
a control module and a controlled module;
the control module including a phase-cut circuit electrically connected with an AC power supply, and continuously cut off a conduction angle of the AC power supply;
the controlled module comprising:
a rectification circuit electrically connected with the phase-cut circuit of the control module, the rectification circuit being adapted to rectify the AC power supply after being cut off by the phase-cut circuit;
a phase detection circuit electrically connected with the rectification circuit, the phase detection circuit being adapted to detect continuously the conduction angle of the AC power supply after being cut off by the phase-cut circuit;
a control unit electrically connected with the phase detection circuit, and
a drive circuit for the inverter electric motor;
wherein the control unit controls the drive circuit for the inverter electric motor to change the rotational speed or action of a DC inverter electric motor according to the conduction angle of the AC power supply that is detected by the phase detection circuit and cut off by the phase-cut circuit.

2. The control apparatus of claim 1, wherein the phase-cut circuit comprises:
a triple-pole AC switch having a first terminal, a second terminal and a gate, the second terminal being electrically connected with the rectification circuit;
a bipolar AC switch having a first anode terminal connected with the gate of the triple-pole AC switch, and a second anode terminal;
a variable resistor electrically connected with the second terminal of the triple-pole AC switch;
a resistor electrically connected with the variable resistor; and
a capacitor having a first end electrically connected with the variable resistor and the second anode terminal of the bipolar AC switch, and a second end electrically connected with the first terminal of the triple-pole AC switch and the AC power supply;
wherein the variable resistor of the phase-cut circuit is adjustable to modulate the size of the conduction angle of the AC power supply cut off by the phase-cut circuit.

3. The control apparatus of claim 2, wherein the controlled module further comprises a bleeder circuit electrically connected with the rectification circuit, the bleeder circuit being adapted to provide sufficient latching current and holding current to the triple-pole AC switch so as to prevent the triple-pole AC switch from false triggering.

4. The control apparatus of claim 3, wherein the phase-cut circuit further comprises a switched capacitor and a change-over switch, the switched capacitor being connected with the change-over switch in series, followed by, connection with the capacitor in parallel; the change-over switch is adapted to be switched to enable the phase-cut circuit to generate a control signal responsive to an abrupt change of the conduction angle, the control signal enables the drive circuit to control the inversion of the DC inverter electric motor.

5. The control apparatus of claim 4, wherein the change-over switch is a bounce switch.

6. The control apparatus of claim 2, wherein the phase-cut circuit further comprises a switched capacitor and a change-over switch, the switched capacitor being connected with the change-over switch in series, followed by connection with the capacitor in parallel; the change-over switch is adapted to be switched to enable the phase-cut circuit to generate a control signal responsive to an abrupt change of the conduction angle, the control signal enables the drive circuit to control the inversion of the DC inverter electric motor.

7. The control apparatus of claim 6, wherein the change-over switch is a bounce switch.

8. The control apparatus of claim 1, wherein the conduction angle of the AC power supply cut off by the phase-cut circuit is in the range between 0° and 60°.

9. A control apparatus for a DC inverter electric motor, comprising:
a control module including a phase-cut circuit electrically connected with an AC power supply and arranged to continuously cut off a conduction angle of the AC power supply until a change in a rotational speed or an action of the DC inverter electric motor; and
a controlled module arranged at a load end of the DC inverter electric motor, the controlled module comprising:
a rectification circuit electrically connected with the phase-cut circuit of the control module, and adapted to rectify the AC power supply after being cut off by the phase-cut circuit;
a bleeder circuit electrically connected with the rectification circuit, and adapted to prevent false triggering;
a phase detection circuit electrically connected with the rectification circuit, and adapted to detect continuously the conduction angle of the AC power supply after being cut off by the phase-cut circuit;
a drive circuit for driving the DC inverter electric motor; and a control unit electrically connected with the phase detection circuit, and arranged to control the drive circuit for the DC inverter electric motor to change the rotational speed or the action of the DC inverter electric motor according to the conduction angle of the AC power supply that is detected by the phase detection circuit and cut off by the phase-cut circuit.

10. The control apparatus of claim 9, wherein the phase-cut circuit comprises:
a triple-pole AC switch having a first terminal, a second terminal electrically connected with the rectification circuit, and a gate;
a bipolar AC switch having a first anode terminal connected with the gate of the triple-pole AC switch, and a second anode terminal;
a variable resistor electrically connected with the second terminal of the triple-pole AC switch;
a resistor electrically connected with the variable resistor; and
a capacitor having a first end electrically connected with the variable resistor and the second anode terminal of the bipolar AC switch, and a second end electrically connected with the first terminal of the triple-pole AC switch and the AC power supply;
wherein the variable resistor of the phase-cut circuit is adjustable to modulate the size of the conduction angle of the AC power supply cut off by the phase-cut circuit.

11. The control apparatus of claim 10, wherein the bleeder circuit is adapted to provide sufficient latching current and holding current to the triple-pole AC switch so as to prevent the triple-pole AC switch from false triggering.

12. The control apparatus of claim 11, wherein the phase-cut circuit further comprises a switched capacitor and a change-over switch, the switched capacitor being connected with the change-over switch in series, followed by, connection with the capacitor in parallel; the change-over switch is adapted to be switched to enable the phase-cut circuit to generate a control signal responsive to an abrupt change of the conduction angle, the control signal enables the drive circuit to control the inversion of the DC inverter electric motor.

13. The control apparatus of claim 12, wherein the change-over switch is a bounce switch.

14. The control apparatus of claim 10, wherein the phase-cut circuit further comprises a switched capacitor and a change-over switch, the switched capacitor being connected with the change-over switch in series, followed by connection with the capacitor in parallel; the change-over switch is adapted to be switched to enable the phase-cut circuit to generate a control signal responsive to an abrupt change of the conduction angle, the control signal enables the drive circuit to control the inversion of the DC inverter electric motor.

15. The control apparatus of claim 14, wherein the change-over switch is a bounce switch.

16. The control apparatus of claim 14, wherein the conduction angle of the AC power supply cut off by the phase-cut circuit is in the range between 0° and 60°.

* * * * *